United States Patent [19]
Keller, Jr.

[11] 3,795,292
[45] Mar. 5, 1974

[54] DRUM BRAKE ASSEMBLY

[75] Inventor: Clarence Keller, Jr., South Bend, Ind.

[73] Assignee: The Bendix Corporation, South Bend, Ind.

[22] Filed: Feb. 12, 1973

[21] Appl. No.: 331,912

[52] U.S. Cl. .............................................. 188/340
[51] Int. Cl. ........................................... F16d 69/04
[58] Field of Search ............ 188/340, 335, 326, 78

[56] References Cited
UNITED STATES PATENTS

| | | | |
|---|---|---|---|
| 2,211,439 | 8/1940 | Schnell et al. | 188/340 |
| 2,263,949 | 11/1941 | Harle | 188/340 |
| 2,828,834 | 4/1958 | Smith | 188/78 |
| 3,186,519 | 6/1965 | Johannesen | 188/340 |

Primary Examiner—Duane A. Reger
Assistant Examiner—Charles E. Frankfort
Attorney, Agent, or Firm—Ken C. Decker; William N. Antonis

[57] ABSTRACT

In a brake assembly having a support member and a floating brake shoe provided with a web slidably mounted between oppositely facing guide ledges fixed to the support member for radial movement of the shoe into frictional engagement with a rotating drum. A preloaded shoe hold down spring is interposed between one of the ledges and the shoe web to urge the web against the other oppositely facing ledge so that the brake shoe is centrally positioned with respect to the drum and held out of contact therewith during brake release.

7 Claims, 5 Drawing Figures

3,795,292

DRUM BRAKE ASSEMBLY

BACKGROUND OF THE INVENTION

The invention relates to automotive vehicle drum brakes and particularly to wedge brakes commonly used on heavy duty vehicles including trucks, truck-tractors, trailers and semi-trailers.

A brake of the wedge actuated type is shown in U.S. Pat. No. 3,362,506 wherein brake actuators, integrally mounted on the brake support member, are drivably connected to a pneumatically powered device through a wedge mechanism for moving the brake shoes into frictional engagement with the drum. This brake is commonly referred to as a floating shoe brake since the two ends of the shoe are slidably carried on the actuator pistons so that the shoe has free sliding chordal movement with respect to the drum surface to adjust concentrically thereto. The shoes are held on the pistons by shoe return springs attached at opposite ends to the respective shoe webs. Due to the weight and size of such brakes, it has been found from experience that brake shoe wear caused by vehicle vibration shifting the shoes against the rotating drum is minimized when the brake is mounted on a vehicle axle so that the shoes are horizontally disposed. Although horizontal mounting of the brake shoes is preferable and produces optimum brake shoe lining wear pattern, such mounting is seldom achieved due to interference between the service brake air chamber of the brake actuator and the vehicle structure, the most common of which is the vehicle springs. The interference problem has been resolved by indexing or rotating the brake assembly about the vehicle axle so that the service brake air chamber, for example, avoids the vehicle spring. However, indexing the brake so that the shoes are no longer horizontally positioned introduces shoe wear into the shoes. This shoe end wear results from the fact that the shoes are slidingly or floatingly carried on the pistons and are free to slide or shift into the drum against the force of the return springs. This sliding action of the shoe ends into the drum, caused principally by vehicle vibration, is aggravated by rough roads and reduced return spring force, the latter due to excessive use, overheating, etc. Therefore, such brakes require constant vigilance to insure effective braking. The present invention is concerned with solving the brake shoe wear problem which heretofore plagued the floating shoe brake.

SUMMARY OF THE INVENTION

A spring brake shoe hold down device for installation in a floating shoe type of drum brake in the field to prevent the shoes from undesirable shifting into engagement with the drum.

A spring brake shoe hold down device for a floating shoe type drum brake is prestressed between a shoe support member, which has a guide ledge on which a brake shoe is radially slidably carried, and the web of the shoe so that the web is urged against the guide ledge with sufficient force to hold the shoe from undesirable shifting against the drum when the brake is indexed off horizontal.

A U-shaped shoe hold down spring insertable into a floating shoe type of drum brake in the field without disassembly of the brake to hold the shoe from shifting into the drum due to vibration and road shock on brakes that are indexed off horizontal.

DETAIL DESCRIPTION

Figure 1:
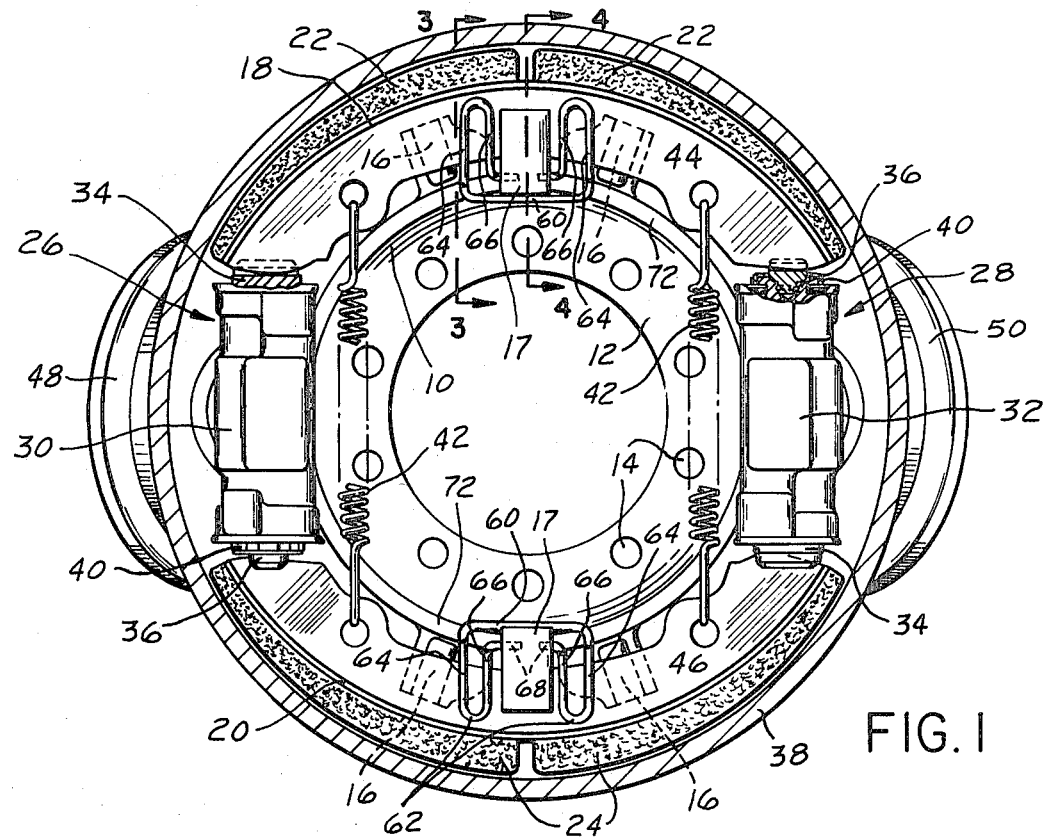
FIG. 1 is a vertical section of a brake assembly taken just inside the brake drum head, and embodying the principles of my invention.

Referring now to FIG. 1, the brake assembly with which the device of my invention is associated includes a support member or torque spider 10, having an inner flange portion 12 with a plurality of circumferentially spaced holes 14 for receiving mounting bolts, not shown, for fastening the spider to a vehicle axle flange, not shown. Guide pads or ledges 16 and 17, spaced apart axially, are diametrically located at the outer periphery of the spider for slidably supporting brake shoes 18 and 20 provided with friction linings 22 and 24 respectively. Actuators 26 and 28, having diametrically disposed housings 30 and 32 respectively, are located between each pair of adjacent ends of shoes 18 and 20. The housings 30 and 32 are integral with the brake support 10 and each housing slidably receives identical plungers or pistons 34 and 36, for sliding movement in a plane transverse to the brake axis for spreading the shoes 18 and 20 into frictional engagement with a rotatable drum 38. The piston 36 includes an adjuster 40 for maintaining proper clearances between the linings 22 and 24 and the drum 38. The automatic adjuster 40 associated with the piston 36 is preferably of the type disclosed in U.S. Pat. No. 3,232,392 to which reference is made for additional details of construction and operation. Shoe return springs 42 interconnect webs 44 and 46 of adjacent ends of the shoes 18 and 20 respectively, for urging their ends against their associated pistons. The shoe webs 44 and 46 have their ends slidingly positioned or floatingly carried on the pistons 34 and 36 to permit chordal or transverse movement of the shoes within the drum so as to adjust to conform to the inner drum surface. The pistons 34 and 36 of the actuators 30 and 32 are operatively connected to service brake air chambers 48 and 50 through wedge assemblies, not shown, of any well known type such as disclosed in U.S. Pat. No. 3,362,506, assigned to the common assignee of this invention and incorporated herein by reference for a more complete dissertation on wedge actuated brakes.

Figure 2:
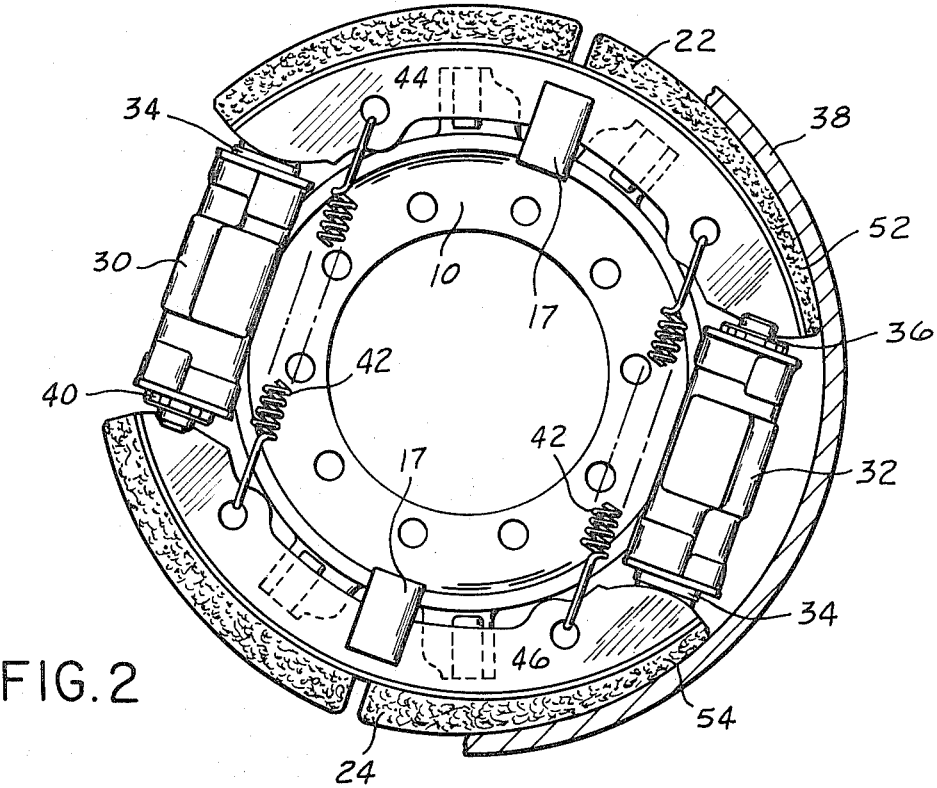
FIG. 2 is a schematic representation of a brake assembly of the type shown in FIG. 1, indexed off horizontal and without the benefit of my invention to illustrate brake lining wear.

Mounting the brake assembly so that the shoes 18 and 20 are horizontally disposed as shown in FIG. 1 is not always practical even though preferable because of interference encountered between the pneumatic power chambers 48 and 50 and the vehicle undercarriage including the springs, not shown. To avoid this interference problem the brake assembly is indexed or rotated so that the shoes are off horizontal as shown in FIG. 2. Although indexing the brake assembly avoids the interfering vehicle structure, it has been found to be a major contributing factor to excessive shoe-end wear of the linings as can be seen with reference to areas 52 and 54 of the linings 22 and 24, of FIG. 2. Indexing the brake assembly inclines the shoe ends on their respective pistons so that any jolting or shaking of the vehicle causes the shoes to slide into engagement with the drum 38. This sliding action of the shoe ends on their respective pistons becomes more acute as the shoe return springs 42 lose their force and resiliency.

The foregoing brief description of the brake assembly of FIG. 1 is that of a floating shoe wedge activated brake, well known in the brake art. The brake will now be further described with respect to the improvement incorporated therein to differentiate it from prior brakes, such as the brake assembly of FIG. 2.

Figure 5:
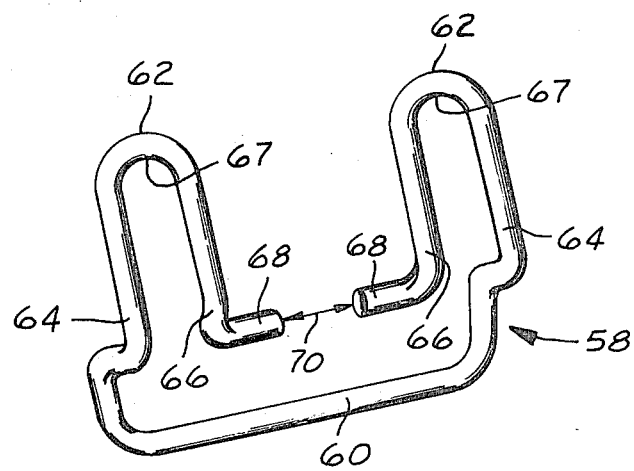
FIG. 5 is a prespective view of a brake shoe hold down spring according to my invention.

In the improved brake, the shoes 18 and 20 are retained concentrically of the drum 38 by a generally U-shaped shoe hold down spring 58 prestressed between the spider 10 and shoes. The shoe hold down device 58 is shown in FIG. 5 apart from the brake assembly of FIG. 1 and is formed from a wire element, preferably of spring steel. The U-shaped hold down device is constructed with a base portion 60 and two spaced-apart identical legs 62 projecting from the base in a generally vertical direction. Each leg is formed as an open-ended wire loop, having one end or side portion 64 of the loop attached to the base 60 and a free end or side portion 66 flexibly supported as an integral part of the loop. The ends 64 and 66 of each loop are joined or closed at 67. Each free end 66 is provided with a spring projection or finger 68 extending inwardly toward the center of the space formed between the spaced-apart legs 62. The fingers 68 are oppositely disposed with their ends in facing relationship to each other and terminating short of contact, in order to form a space 70 between the fingers 68 so that the device 58 can be readily attached to a brake assembly in the field.

Figure 3:
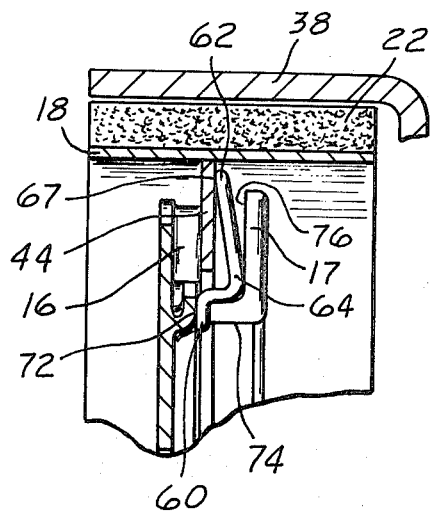
FIG. 3 is a section through the brake of FIG. 1 on line 3—3.
Figure 4:
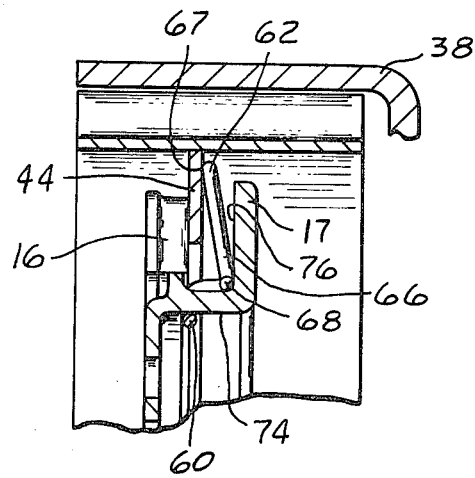
FIG. 4 is a section taken on the line 4—4 of FIG. 1.

As illustrated in FIG. 1, the shoe hold down device 58 is assembled on the brake with the base 60 supported on an outer rim 72 of the spider 10. The legs 62 straddle the ledge 17 so that the base 60 engages the underside 74 of the ledge 17, securing the device from outward radial movement, as best shown in FIGS. 3 and 4. The free ends 66 of the legs 62 overlay the web and are stressed inwardly during assembly, as viewed in FIG. 1, so that the fingers 68 engage the inner side 76 of the ledge 17, as shown in FIG. 4. Stressing the ends 66, as aforementioned, so as to cause the fingers or projections 68 to engage the inner side of ledge 17 rotates the closed ends 67 of the legs 62 against the web 44, as viewed in FIGS. 3 and 4, urging the web into contact with the ledge 16.

The invention provides an improved one-piece brake shoe hold down spring 58 having the advantage of field installation without disassembling the brake to correct shoe end wear on floating shoe drum brakes. The device 58 is merely interposed or prestressed between the support member 10 and the brake shoe 18 so that the base 60 is supported on the spider and the fingers 68 engage the inner side 76 of the ledge 17, which rotates the legs 62 against the web 44 to thereby preload the shoe against sliding into the drum due to vehicle vibration.

I claim:

1. In a brake assembly having a torque spider with oppositely facing ledges located at the outer periphery thereof and spaced-apart axially for receiving a shoe web of an associated brake shoe floatingly supported on its ends and an actuator for moving the shoe into engagement with a rotating drum, the improvement for retaining the shoe concentrically of the drum, said improvement comprising:

a shoe hold down device having a base supported on the spider and two spaced-apart legs projecting from the base in overlaying relationship to the shoe web, and a spring finger carried by each leg urged into engagement with one of the ledges so that the legs are prestressed against the web, forcing the web against the other of the oppositely facing ledges to thereby retain the shoe concentrically.

2. The improvement in claim 1 wherein the one ledge is formed with an inner side with which the fingers are engaged and an underside on which the base abuts to position the device with respect to the shoe.

3. The improvement in claim 2 wherein each leg is an open-ended wire loop having a closed end abutting the web and an open end with two sides connected respectively to the base and to its related finger.

4. The improvement in claim 3 wherein the sides forming each loop are substantially parallel, one side being integral with the base and flexible with respect thereto, and the other side being freely flexible about the closed end of the loop.

5. An improved one-piece brake shoe hold down spring adapted to be inserted between a brake shoe and a brake support member, wherein the improvement comprises:

a wire formed with a base from which two spaced-apart legs in the form of loops extend, each loop having a pair of sides joined at one end and open at the other end with one side of the open end of the loop attached to the base and the other side freely flexible to be prestressed when attached to a brake.

6. The improvement in claim 5 wherein the joined end of each loop is integral with said one side of the open end of the loop and rotatably flexible about the base.

7. The improvement in claim 6 wherein said other side of each loop has a finger extending therefrom toward the other finger and terminating short of engagement with one another to provide a space between said fingers to facilitate insertion.

* * * * *